US012563644B2

(12) United States Patent
Onishi et al.

(10) Patent No.: US 12,563,644 B2
(45) Date of Patent: Feb. 24, 2026

(54) WIRING SHEET, AND SHEET-LIKE HEATER

(71) Applicant: LINTEC CORPORATION, Tokyo (JP)

(72) Inventors: Go Onishi, Tokyo (JP); Takuya Oshima, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 713 days.

(21) Appl. No.: 17/912,435

(22) PCT Filed: Mar. 12, 2021

(86) PCT No.: PCT/JP2021/010060
§ 371 (c)(1),
(2) Date: Sep. 16, 2022

(87) PCT Pub. No.: WO2021/187361
PCT Pub. Date: Sep. 23, 2021

(65) Prior Publication Data
US 2023/0147333 A1 May 11, 2023

(30) Foreign Application Priority Data
Mar. 19, 2020 (JP) ................................ 2020-048987

(51) Int. Cl.
*H05B 3/12* (2006.01)
*H05B 3/03* (2006.01)
(Continued)

(52) U.S. Cl.
CPC ................ *H05B 3/12* (2013.01); *H05B 3/03* (2013.01); *H05B 3/267* (2013.01); *H05B 3/145* (2013.01);
(Continued)

(58) Field of Classification Search
CPC . H05B 3/12; H05B 3/03; H05B 3/267; H05B 3/145; H05B 3/34; H05B 2203/005;
(Continued)

(56) References Cited

U.S. PATENT DOCUMENTS 4,049,899 A * 9/1977 Shimizu .................... G05F 1/14 373/40
2006/0096972 A1* 5/2006 Nakamura ........ H01L 21/67103 219/544
(Continued)

FOREIGN PATENT DOCUMENTS

CN 102159895 A 8/2011
CN 109792803 A 5/2019
(Continued)

OTHER PUBLICATIONS

JP 2019179686 A—Translation (Year: 2025).*
(Continued)

*Primary Examiner* — Elizabeth M Kerr
*Assistant Examiner* — Keith Brian Assante
(74) *Attorney, Agent, or Firm* — Rimon P.C.

(57) ABSTRACT

A wiring sheet includes: a pseudo sheet structure including a plurality of conductive linear bodies arranged at intervals; a pair of electrodes; and a first power feeder provided for one of the electrodes and a second power feeder provided for the other of the electrodes. Assuming that the number of the conductive linear bodies is N, a resistance value of a n-th conductive linear body counted from a side at which the first power feeder and the second power feeder are provided is $r_n$, and a resistance value of the electrodes is R, all of conditions represented by numerical formulae (F1), (F2), and (F3) below are satisfied. (F1): $r_1/R \leq 300$ (F2): $r_{n+1} \leq r_n$ (In the formula (F2), n is an integer of 1 or more) (F3): $0 < r_1 - r_N$.

5 Claims, 8 Drawing Sheets

(51) Int. Cl.

| | |
|---|---|
| ***H05B 3/14*** | (2006.01) |
| ***H05B 3/26*** | (2006.01) |
| ***H05B 3/34*** | (2006.01) |

(52) U.S. Cl.

CPC .......... *H05B 3/34* (2013.01); *H05B 2203/005* (2013.01); *H05B 2203/007* (2013.01); *H05B 2203/013* (2013.01); *H05B 2214/04* (2013.01)

(58) Field of Classification Search

CPC ........ H05B 2203/007; H05B 2203/013; H05B 2214/04

See application file for complete search history.

(56) References Cited

U.S. PATENT DOCUMENTS

| | | | | |
|---|---|---|---|---|
| 2013/0251619 | A1 | 9/2013 | Rikihisa et al. | |
| 2020/0107408 | A1* | 4/2020 | Torrico | H05B 3/34 |
| 2020/0276922 | A1* | 9/2020 | Muramatsu | H05B 3/34 |
| 2021/0185768 | A1* | 6/2021 | Ito | B32B 27/36 |
| 2021/0340764 | A1* | 11/2021 | Düwel | H05B 3/267 |
| 2022/0086958 | A1* | 3/2022 | Yurugi | H05B 1/023 |

FOREIGN PATENT DOCUMENTS

| | | | |
|---|---|---|---|
| JP | S59-187087 | U | 12/1984 |
| JP | S62-197288 | U | 12/1987 |
| JP | H05-159868 | A | 6/1993 |
| JP | H07-192856 | A | 7/1995 |
| JP | H07-192857 | A | 7/1995 |
| JP | 2012-126635 | A | 7/2012 |
| JP | 2019179686 | A | * 10/2019 |
| KR | 10-2019-0030262 | A | 3/2019 |
| TW | 201832614 | A | 9/2018 |
| WO | 2017/086395 | A1 | 5/2017 |
| WO | 2019-106389 | A1 | 6/2019 |

OTHER PUBLICATIONS

Office Action issued for the corresponding Taiwanese Patent Application No. 110109495, dated Oct. 28, 2024.

International Search Report issued in corresponding International Patent Application No. PCT/JP2021/010060, dated May 11, 2021, with English translation.

English translation of the International Preliminary Report on Patentability issued in corresponding International Patent Application No. PCT/JP2021/010060, dated Sep. 20, 2022.

Office Action issued in the corresponding Korean Patent Application No. 10-2022-7032028, dated Apr. 2, 2025.

Office Action dated May 24, 2025, issued in corresponding Chinese Application No. 202180022418.0, 12 pages.

Notice of Allowance dated Nov. 3, 2025, issued in corresponding Chinese patent application No. 202180022418.0.

Notice of Allowance dated Dec. 12, 2025, issued in corresponding Korean patent application No. 10-2022-7032028.

* cited by examiner

WIRING SHEET, AND SHEET-LIKE HEATER

CROSS REFERENCE TO RELATED APPLICATIONS

This patent application is the U.S. National Phase under 35 U.S.C. § 371 of International Application No. PCT/JP2021/010060, filed on Mar. 12, 2021, which claims the benefit of Japanese Patent Application No. 2020-048987, dated Mar. 19, 2020, the entire contents of each are hereby incorporated by reference in their entirety.

TECHNICAL FIELD

The present invention relates to a wiring sheet and a sheet-shaped heater.

BACKGROUND ART

A sheet-shaped conductive member (hereinafter also referred to as a "conductive sheet" in some cases), which includes a pseudo sheet structure in which a plurality of conductive linear bodies are arranged at intervals, may be used as a component of various articles (e.g. a heat-generating body of a heater, a material of heat-generating textiles, and a protection film (anti-shattering film) for a display device).

Patent Literature 1 discloses an example of a sheet usable for a heat-generating body in a form of a conductive sheet including a pseudo sheet structure having a plurality of linear bodies arranged at intervals to extend unidirectionally. A pair of electrodes is provided at respective ends of the plurality of linear bodies to provide a wiring sheet usable as a heat-generating body.

CITATION LIST

Patent Literature(s)

Patent Literature 1: WO 2017/086395 A

SUMMARY OF THE INVENTION

Problem(s) to be Solved by the Invention

The electrodes used for the wiring sheet are typically provided by metallic foil or silver paste. However, in view of flexibility of electrode portions of the wiring sheet, the use of a metal wire or the like in place of the metallic foil or silver paste has been studied. On the other hand, when a thin electrode such as a metal wire is used as electrodes, a resistance value of the electrodes is relatively large. Thus, the resistance value of the electrodes, which should be normally negligible, cannot be ignored. As a result, it is found that temperature variation may occur when electric current is applied to the wiring sheet for heat generation.

An object of the invention is to provide a wiring sheet and a sheet-shaped heater capable of restraining temperature variation.

Means for Solving the Problem(s)

A wiring sheet according to an aspect of the invention includes: a pseudo sheet structure including a plurality of conductive linear bodies arranged at intervals; a pair of electrodes; and a first power feeder provided for one of the electrodes and a second power feeder provided for the other of the electrodes. Assuming that the number of the conductive linear bodies is N, a resistance value of a n-th conductive linear body counted from a side at which the first power feeder and the second power feeder are provided is $r_n$, and a resistance value of the electrodes is R, all of conditions represented by numerical formulae (F1), (F2), and (F3) below are satisfied, $$r_1/R \leq 300 \quad \text{(F1)}$$

$$r_{n+1} \leq r_n \quad \text{(F2)}$$

where n is an integer of 1 or more in the formula (F2), and $$0 < r_1 - r_N \leq NR \quad \text{(F3).}$$

In the wiring sheet according to the above aspect of the invention, a condition represented by a numerical formula (F3-1) below is preferably satisfied.

$$r_1 - r_N \leq NR \quad \text{(F3-1)}$$

In the wiring sheet according to the above aspect of the invention, an interval between the conductive linear bodies is preferably 20 mm or less.

In the wiring sheet according to the above aspect of the invention, a width of each of the electrodes is preferably 100 mm or less in a plan view of the pseudo sheet structure.

It is preferable that the wiring sheet according to the above aspect of the invention further includes a base material supporting the pseudo sheet structure.

A sheet-shaped heater according to another aspect of the invention includes the wiring sheet according to the above aspect of the invention.

According to the above aspects of the invention, a wiring sheet and a sheet-shaped heater capable of restraining temperature variation can be provided.

DESCRIPTION OF EMBODIMENT(S)

First Exemplary Embodiment

Exemplary embodiment(s) of the invention will be described below with reference to the attached drawings. The scope of the invention is not limited to the disclosures of the exemplary embodiment(s). It should be noted that some parts of the drawings are enlarged or reduced in size for the convenience of description.

Wiring Sheet

Figure 1:
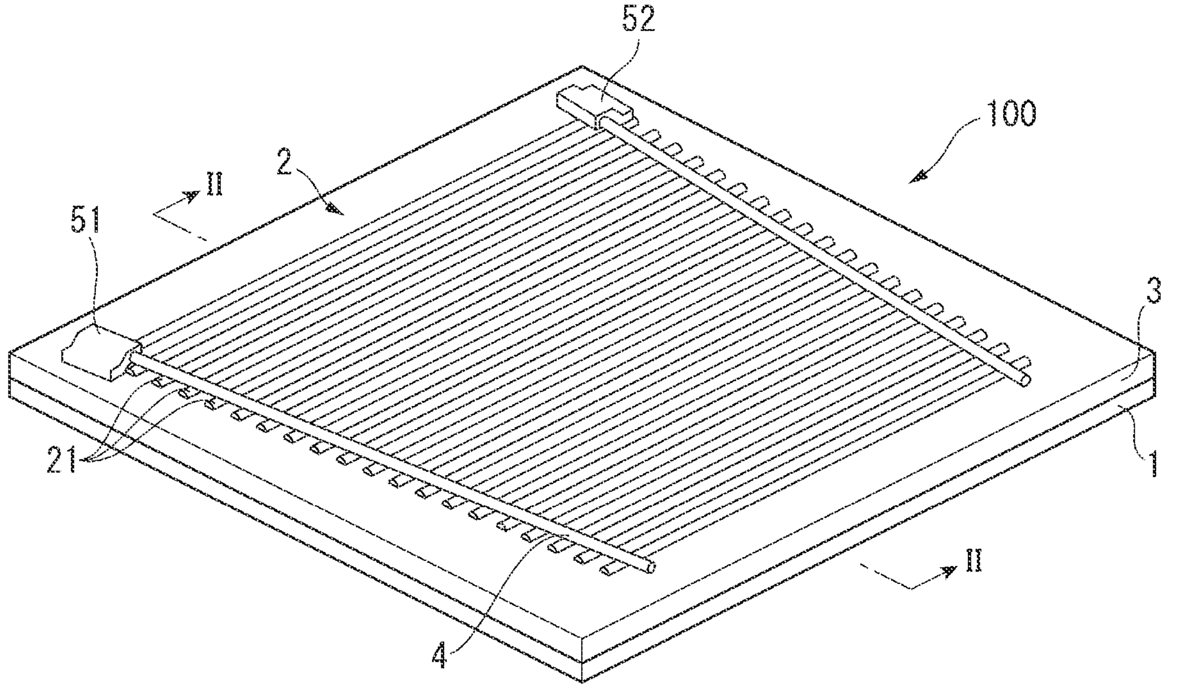
FIG. 1 schematically shows a wiring sheet according to a first exemplary embodiment of the invention.
Figure 2:
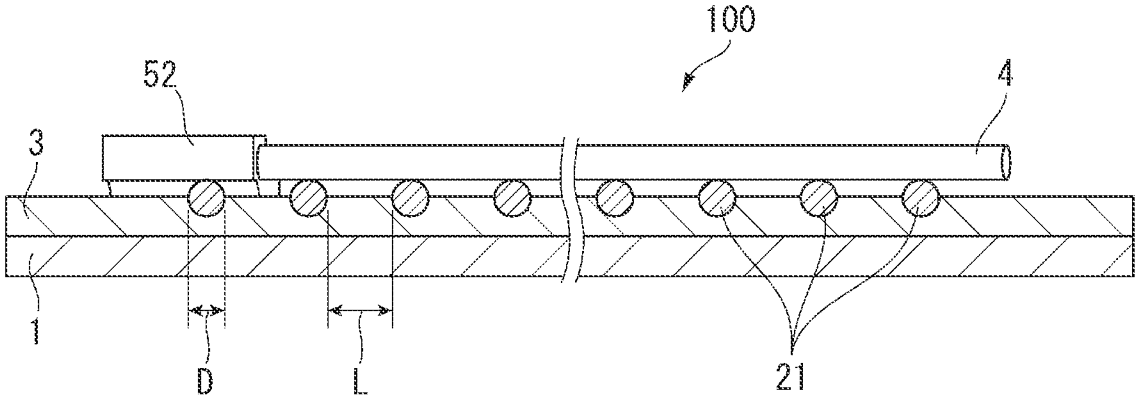
FIG. 2 is a cross sectional view taken along a line II-II in FIG. 1.

As shown in FIGS. 1 and 2, a wiring sheet 100 according to the exemplary embodiment includes a base material 1, a pseudo sheet structure 2, a resin layer 3, and a pair of electrodes 4. Specifically, the wiring sheet 100 is a laminate of the base material 1, the resin layer 3, and the pseudo sheet structure 2, which are laminated in this order. The pseudo sheet structure 2 includes a plurality of conductive linear bodies 21 arranged at intervals. A first power feeder 51 is provided on one of the electrodes 4, and a second power feeder 52 is provided on the other of the electrodes 4.

In the exemplary embodiment, assuming that the number of the conductive linear bodies 21 is N, a resistance value of the n-th conductive linear body 21 counted from the side at which the first and second power feeders 51 and 52 are provided is $r_n$ [Ω], and a resistance value of the electrodes 4 is R [Ω], it is necessary that all of conditions represented by numerical formulae (F1), (F2), and (F3) described below should be satisfied.

Herein, the wording "the n-th conductive linear body 21 counted from the side at which the first and second power feeders 51 and 52 are provided" refers to one of the conductive linear bodies 21, which is electrically connected to the pair of electrodes 4 and provided at the n-th location counted from the first and second power feeders 51 and 52 along the wiring pattern of the wiring sheet 100.

In the exemplary embodiment, it is necessary that the condition represented by the numerical formula (F1) should be satisfied.

$$r_1/R \leq 300 \quad \text{(F1)}$$

When the value $r_1/R$ exceeds 300, the resistance value of the conductive linear bodies 21 generating heat is sufficiently larger than the resistance value of the electrodes 4, Thus, the resistance value of the electrodes 4 is mostly negligible in the wiring sheet 100, and the problem of temperature variation is not likely to occur.

In contrast, the problem of temperature variation is more likely to occur as the value $r_1/R$ is smaller, where the use of the wiring sheet 100 according to the exemplary embodiment is of great significance.

The value $r_1/R$ may be 200 or less, or 100 or less. However, an excessively small value of $r_1/R$ leads to heat generation in the electrodes 4. The value $r_1/R$ is thus preferably 10 or more.

In the exemplary embodiment, it is necessary that the condition represented by the numerical formula (F2) should be satisfied.

$$r_{n+1} \leq r_n \quad \text{(F2)}$$

When the condition represented by the numerical formula (F2) is not satisfied, temperature variation cannot be restrained.

In the numerical formula (F2), n is an integer of 1 or more. An upper limit of n is the number N of the conductive linear bodies 21.

The number N of the conductive linear bodies 21 is preferably 3 or more, more preferably 5 or more, and further preferably 10 or more. The temperature variation is more likely to occur as the number of the conductive linear bodies 21 increases. However, the temperature variation can be restrained by the wiring sheet 100 according to the exemplary embodiment even when the number of the conductive linear bodies 21 is large. The upper limit of the number N of the conductive linear bodies 21 is not specifically limited, and is, for instance, 150.

In the exemplary embodiment, it is necessary that the condition represented by the numerical formula (F3) should be satisfied.

$$0 < r_1 - r_N \quad \text{(F3)}$$

When the condition represented by the numerical formula (F3) is not satisfied, the temperature variation cannot be restrained.

In addition, in order to further restrain the temperature variation, the condition represented by a numerical formula (F3-1) below is preferably satisfied.

$$r_1 - r_N \leq NR \quad \text{(F3-1)}$$

When the value $r_1$-$r_N$ is equal to or less than a numerical value obtained by multiplying the number N of the conductive linear bodies 21 by a resistance value R of the electrodes 4, the temperature variation can be further restrained. For the same reasons, the value $r_1 - r_N$ is more preferably in a range from NR/8 to NR, further preferably in a range from NR/4 to NR, and especially preferably in a range from NR/2 to NR.

The inventors of the invention suppose that the reason why the temperature variation is restrained when all of the conditions represented by the numerical formulae (F1), (F2), and (F3) are satisfied, is as follows.

Specifically, when the condition represented by the numerical formula (F1) is satisfied, a ratio of the resistance value of the conductive linear bodies 21 (heat generators) to the resistance value of the electrodes 4 is small. In this case, the resistance value of the electrodes 4 that is normally negligible, cannot be ignored. That is, the temperature variation may occur when electric current is applied to the wiring sheet 100 for heat generation. This is because the conductive linear bodies 21 distal to the first and second power feeders 51 and 52 are greatly affected by the resistance of the electrodes 4 connecting the power feeders and the conductive linear bodies 21. The inventors of the invention presume that, when electric current is applied to the wiring sheet 100 for heat generation, the electric current flowing in the distal conductive linear bodies 21 is relatively small, and consequently, the temperature of the distal conductive linear bodies 21 is lower than that of other conductive linear bodies 21.

In contrast, when the conditions represented by the numerical formulae (F2) and (F3) are satisfied, the resistance value $r_n$ of the nth conductive linear body 21 is lower with increased distance from the first and second power feeders 51 and 52. The conductive linear bodies 21 distal to the first and second power feeders 51 and 52 are greatly affected by the resistance of the electrodes 4 connecting the power feeders and the conductive linear bodies 21, However, since the resistance value $r_n$ of the conductive linear bodies 21 is low, the resistance effect can be compensated. The above is the assumption of the inventors about the reasons why the temperature variation is restrained.

The resistance values of the conductive linear bodies 21 and the electrodes 4 can be set by any known method as appropriate, for instance, can be adjusted by changing the material, cross-sectional area, and/or length.

For instance, the length of the conductive linear bodies 21 may be shorter with increased distance from the first and second power feeders 51 and 52, as shown in FIG. 1. In this configuration, the resistance value of the conductive linear bodies 21 can be lower with increased distance from the first and second power feeders 51 and 52. Further, the resistance value can be reduced by increasing the electric conductivity or the cross-sectional area of the conductive linear bodies 21.

Base Material

Examples of the base material 1 include a synthetic resin film, paper, metallic foil, nonwoven fabric, cloth, and glass film. The base material 1 is configured to directly or indirectly support the pseudo sheet structure 2. The base material 1 is preferably a flexible base material.

Examples of the usable flexible base material include a synthetic resin film, paper, nonwoven fabric, and cloth. The flexible base material is preferably a synthetic resin film, nonwoven fabric, or cloth, more preferably a nonwoven fabric or cloth.

Examples of the synthetic resin film include a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene vinyl acetate copolymer film, ionomer resin film, ethylene-(meth)acrylate copolymer film, ethylene-(meth)acrylate ester copolymer film, polystyrene film, polycarbonate film, and polyimide film. Other examples of the flexible base material include cross-linked films and laminate films of the above materials.

Examples of the paper include high-quality paper, recycled paper, and craft paper. Examples of the nonwoven fabric include spun-bond nonwoven fabric, needle-punched nonwoven fabric, melt-blown nonwoven fabric, and spunlace nonwoven fabric. Examples of the cloth include woven fabric and knit fabric. It should be noted that the paper, nonwoven fabric, and cloth for the flexible base material are not limited to these examples.

Pseudo Sheet Structure

The pseudo sheet structure 2 is configured by the plurality of conductive linear bodies 21 arranged at intervals. Specifically, the pseudo sheet structure 2 is a structure where the plurality of conductive linear bodies 21 are arranged at intervals to form a flat or curved surface. The conductive linear bodies 21 are linear-shaped in a plan view of the wiring sheet 100. The pseudo sheet structure 2 is configured by arraying the plurality of conductive linear bodies 21 in a direction intersecting an axial direction of the conductive linear bodies 21.

The conductive linear bodies 21 may be wave-shaped in a plan view of the wiring sheet 100. Specific examples of the wave-shaped conductive linear bodies 21 include sine-wave, circular wave, rectangular wave, triangular wave, and saw-tooth wave conductive linear bodies 21. The pseudo sheet structure 2 of such a structure can restrain breakage of the conductive linear bodies 21 when the wiring sheet 100 is stretched in the axial direction of the conductive linear bodies 21.

The volume resistivity of the conductive linear bodies 21 is preferably in a range from $1.0\times10^{-9}$ Ω·m to $1.0\times10^{-3}$ Ω·m, and more preferably in a range from $1.0\times10^{-8}$ Ω·m to $1.0\times10^{-4}$ Ω·m. Surface resistance of the pseudo sheet structure 2 is easily lowered when the volume resistivity of the conductive linear bodies 21 is within the above range.

The volume resistivity of the conductive linear bodies 21 is measured as follows. A silver paste is applied on two points (an end and a part having a length of 40 mm from the end) of the conductive linear bodies 21 and the resistance at the two points are measured to determine a resistance value of the conductive linear bodies 21. Then, a value, which is obtained by multiplying the cross-sectional area (unit: $m^2$) of the conductive linear bodies 21 by the above resistance value, is divided by the above length (0.04 m) to calculate the volume resistivity of the conductive linear bodies 21.

The cross-sectional shape of the conductive linear bodies 21, which is not specifically limited, may be polygonal, flattened, ellipsoidal, or circular. An ellipsoidal shape or a circular shape is preferable in view of compatibility with the resin layer 3.

When the cross section of the conductive linear body 21 is circular, a thickness (diameter) D of the conductive linear bodies 21 (see FIG. 2) is preferably in a range from 5 μm to 3 mm. In order to restrain an increase in sheet resistance and to improve heating efficiency and anti-insulation/breakage properties when the wiring sheet 100 is used as a heat-generating body, the diameter D of the conductive linear bodies 21 is more preferably in a range from 8 μm to 1 mm, and further preferably in a range from 12 μm to 100 μm, When the cross section of the conductive linear bodies 21 is ellipsoidal, it is preferable that the major axis thereof is in the same range as the diameter D described above.

The diameter D of the conductive linear bodies 21 is an average of diameters at randomly selected five points of the conductive linear bodies 21 of the pseudo sheet structure 2 measured through an observation using a digital microscope.

An interval L (see FIG. 2) between the conductive linear bodies 21 is preferably 20 mm or less, more preferably in a range from 0.5 mm to 15 mm, and further preferably in a range from 1 mm to 10 mm.

When the interval between the conductive linear bodies 21 falls within the above range, the conductive linear bodies are densely arrayed to some extent. This can enhance the performance of the wiring sheet 100 such as keeping the resistance of the pseudo sheet structure at a low level and providing uniform distribution in temperature rise when the wiring sheet 100 is used as a heat-generating body.

The interval L between the conductive linear bodies 21 is obtained by observing visually or using a digital microscope the conductive linear bodies 21 of the pseudo sheet structure 2 and measuring the interval between two adjacent conductive linear bodies 21.

It should be noted that the interval between two adjacent conductive linear bodies 21 herein refers to a length between facing parts of the two conductive linear bodies 21 in an arraying direction of the conductive linear bodies 21 (see FIG. 2). When the conductive linear bodies 21 are arrayed at uneven intervals, the interval L is an average of the intervals between all of the pairs of the conductive linear bodies 21 adjacent to each other.

The conductive linear bodies 21, of which structure is not specifically limited, are preferably linear bodies including a metal wire (hereinafter also referred to as a "metal wire linear body" in some cases). The metal wire is excellent in heat conductivity, electric conductivity, handleability, and versatility. The use of the metal wire linear bodies as the conductive linear bodies 21 facilitates the improvement of light transmissivity while reducing the resistance value of the pseudo sheet structure 2. Further, when the wiring sheet 100 (pseudo sheet structure 2) is used as the heat-generating body, heat is easily and quickly generated. Furthermore, small-diameter linear bodies as described above are easily obtainable.

It should be noted that examples of the conductive linear body 21 include, in addition to the metal wire linear body, a linear body including a carbon nanotube and a linear body in a form of a conductively coated string.

The metal wire linear body may be a linear body made of a single metal wire or a linear body provided by spinning a plurality of metal wires.

Examples of the metal wire include wires containing metals, such as copper, aluminum, tungsten, iron, molybdenum, nickel, titanium, silver, and gold, or alloys containing two or more metals (e.g., steels such as stainless steel and carbon steel, brass, phosphor bronze, zirconium-copper alloy, beryllium copper, iron nickel, nichrome, nickel titanium, kanthal, hastelloy, and rhenium tungsten). The metal wire may be plated with tin, zinc, silver, nickel, chromium, nickel-chromium alloy, solder, or the like. The surface of the metal wire may be coated with a later-described carbon material or a polymer. Especially, a wire containing one or more metals selected from among tungsten, molybdenum and alloys containing tungsten and molybdenum is preferable in terms of providing the conductive linear bodies 21 with a low volume resistivity.

The metal wire may be coated with a carbon material. Coating the metal wire with a carbon material reduces metallic luster, making it easy for the metal wire to be less noticeable. Further, the metal wire coated with a carbon material is restrained from metal corrosion.

Examples of the carbon material usable for coating the metal wire include amorphous carbon (e.g. carbon black, active carbon, hard carbon, soft carbon, mesoporous carbon, and carbon fiber), graphite, fullerene, graphene, and a carbon nanotube.

The linear body including a carbon nanotube is obtained by, for instance, drawing, from an end of a carbon nanotube forest (which is a grown form provided by causing a plurality of carbon nanotubes to grow on a substrate, being oriented in a vertical direction relative to the substrate, and is also referred to as "array"), the carbon nanotubes into a sheet form, and spinning a bundle of the carbon nanotubes after drawn carbon nanotube sheets are bundled. When the carbon nanotubes are not spun, a ribbon-shaped carbon nanotube linear body is obtained. When the carbon nanotubes are spun, a yarn-shaped linear body is obtained. The ribbon-shaped carbon nanotube linear body is a linear body without a structure in which the carbon nanotubes are twisted. Alternatively, the carbon nanotube linear body can be obtained by performing, for instance, spinning from a dispersion liquid of carbon nanotubes. The production of the carbon nanotube linear body by spinning can be performed by, for instance, a method disclosed in U.S. Patent Application Publication No. 2013/0251619 (JP 2012-126635 A). The use of the yarn-shaped carbon nanotube linear bodies is preferable in order to obtain carbon nanotube linear bodies having a uniform diameter. The yarn-shaped carbon nanotube linear bodies are preferably produced by spinning the carbon nanotube sheets in order to obtain carbon nanotube linear bodies with high purity. The carbon nanotube linear body may be a linear body provided by knitting two or more carbon nanotube linear bodies. Alternatively, the carbon nanotube linear body may be a linear body provided by combining a carbon nanotube and another conductive material (hereinafter, also referred to as "composite linear body").

Examples of the composite linear body include: (1) a composite linear body obtained by depositing an elemental metal or metal alloy on a surface of a forest, sheets or a bundle of carbon nanotubes, or a spun linear body through a method such as vapor deposition, ion plating, sputtering or wet plating in the process of manufacturing a carbon nanotube linear body obtained by drawing carbon nanotubes from an end of the carbon nanotube forest to form the sheets, bundling the drawn carbon nanotube sheets and then spinning the bundle of the carbon nanotubes; (2) a composite linear body in which a bundle of carbon nanotubes is spun with a linear body of an elemental metal or a linear body or composite linear body of a metal alloy; and (3) a composite linear body in which a carbon nanotube linear body or a composite linear body is woven with a linear body of an elemental metal or a linear body or composite linear body of a metal alloy. In the composite linear body of (2), metal may be supported on the carbon nanotubes when spinning the bundle of the carbon nanotubes as in the composite linear body of (1). Further, although the composite linear body of (3) is a composite linear body provided by weaving two linear bodies, the composite linear body of (3) may be provided by weaving three or more carbon nanotube linear bodies, linear bodies of an elemental metal, or linear bodies or composite linear bodies of a metal alloy, as long as at least one linear body of an elemental metal, or linear body or composite linear body of a metal alloy is contained.

Examples of the metal for the composite linear body include elemental metals such as gold, silver, copper, iron, aluminum, nickel, chrome, tin, and zinc and alloys containing at least one of these elemental metals (a copper-nickel-phosphorus alloy, a copper-iron-phosphorus-zinc alloy, etc.).

The conductive linear body 21 may be a linear body in a form of a conductive-coated yarn. Examples of the yarn include yarns made from resins, such as nylon and polyester, by spinning. Examples of the conductive coating include coating films of a metal, a conductive polymer, a carbon material, and the like. The conductive coating can be formed by plating, vapor deposition, or the like. The linear body including the conductive-coated yarn can be improved in conductivity of the linear body with flexibility of the yarn maintained. In other words, a reduction in resistance of the quasi-sheet structure 20 is facilitated.

Resin Layer

The resin layer 3 is a layer containing a resin. The resin layer 3 can directly or indirectly support the pseudo sheet structure 2. The resin layer 3 is preferably a layer containing an adhesive. The conductive linear bodies 21 are easily attached to the resin layer 3 by adhesive when the pseudo sheet structure 2 is formed on the resin layer 3.

The resin layer 3 may be a layer made from a resin capable of being dried or cured. A hardness sufficient for protecting the pseudo sheet structure 2 is thus imparted to the resin layer 3. Accordingly, the resin layer 3 also functions as a protection film. Further, the cured or dried resin layer 3 exhibits impact resistance, so that the wiring sheet can be inhibited from being deformed by impact.

The resin layer 3 is preferably curable with an energy ray such as an ultraviolet ray, visible energy ray, infrared ray, or electron ray in terms of an easy curability in a short time. It should be noted that "curing with an energy ray" includes thermosetting by energy-ray heating.

Examples of the adhesive in the resin layer 3 include: a thermosetting adhesive that is curable by heat; a so-called heat-seal adhesive that is bondable by heat; and an adhesive that exhibits stickiness when wetted. However, in terms of easy application, the resin layer 3 is preferably energy-ray-curable. An energy-ray-curable resin is exemplified by a compound having at least one polymerizable double bond in a molecule, preferably an acrylate compound having a (meth)acryloyl group.

Examples of the acrylate compound include: chain aliphatic skeleton-containing (meth)acrylates (e.g., trimethylol propane tri(meth)acrylate, tetramethylol methanetetra(meth) acrylate, pentaerythritol tri(meth)acrylate, pentaerythritol tetra(meth)acrylate, dipentaerythritol monohydroxy penta (meth)acrylate, dipentaerythritol hexa(meth)acrylate, 1,4-butylene glycol di(meth)acrylate, and 1,6-hexanediol di(meth)acrylate); cyclic aliphatic skeleton-containing (meth) acrylates (e.g., dicyclopentanyl di(meth)acrylate and dicyclopentadiene di(meth)acrylate); polyalkylene glycol (meth)acrylates (e.g., polyethyleneglycol di(meth)acrylate); oligoester (meth)acrylate; urethane (meth)acrylate oligomer; epoxy-modified (meth)acrylate; polyether (meth) acrylates other than the above polyalkylene glycol (meth) acrylates; and itaconic acid oligomer.

A weight average molecular weight (Mw) of the energy-ray-curable resin is preferably in a range from 100 to 30,000, more preferably from 300 to 10,000.

Only one kind or two or more kinds of the energy-ray-curable resins may be contained in the adhesive composition. In a case where two or more kinds of the energy-ray-curable resins are contained, a combination and ratio of the energy-ray-curable resins are selected as needed. In addition, the energy ray curable resin may be combined with a later-described thermoplastic resin. The combination and ratio of the energy ray curable resin and the thermoplastic resin can be determined as needed.

The resin layer 3 may be a sticky agent layer formed from a sticky agent (a pressure-sensitive adhesive agent). The sticky agent in the sticky agent layer is not particularly limited. Examples of the sticky agent include an acrylic sticky agent, a urethane sticky agent, a rubber sticky agent, a polyester sticky agent, a silicone sticky agent, and a polyvinyl ether sticky agent. Among the above, the sticky agent is preferably at least one sticky agent selected from the group consisting of an acrylic sticky agent, urethane sticky agent, and rubber sticky agent, more preferably an acrylic sticky agent.

Examples of an acrylic sticky agent include a polymer including a constituent unit derived from alkyl (meth)acrylate having a linear alkyl group or a branched alkyl group (i.e., a polymer with at least alkyl (meth)acrylate polymerized) and an acrylic polymer including a constituent unit derived from a (meth)acrylate with a ring structure (i.e., a polymer with at least a (meth)acrylate with a ring structure polymerized). Herein, the "(meth)acrylate" is used as a term referring to both "acrylate" and "methacrylate", and the same applies to other similar terms.

When the acrylic polymer is a copolymer, the form of the copolymerization is not particularly limited. The acrylic copolymer may be any of a block copolymer, a random copolymer, and a graft copolymer.

When the acrylic polymer is a copolymer, the form of the copolymerization is not particularly limited. The acrylic copolymer may be any of a block copolymer, a random copolymer, and a graft copolymer.

The acrylic copolymer may be cross-linked by a cross-linker. Examples of the cross-linker include a known epoxy cross-linker, isocyanate cross-linker, aziridine cross-linker, and metal chelate cross-linker. In cross-linking the acrylic copolymer, a hydroxyl group, a carboxyl group, or the like, which is reactive with the above cross-linkers, can be introduced into the acrylic copolymer as a functional group derived from a monomer component of the acrylic copolymer.

When the resin layer 3 is formed from a sticky agent, the resin layer 3 may further contain the above-described energy ray curable resin in addition to the sticky agent. When the acrylic sticky agent is used as the sticky agent, a compound having a functional group reactive with the functional group derived from the monomer component of the acrylic copolymer and an energy-ray polymerizable functional group in one molecule may be used as the energy-ray curable component. Reaction between the functional group of the compound and the functional group derived from the monomer component of the acrylic copolymer enables a side chain of the acrylic copolymer to be polymerizable by energy ray irradiation. When the sticky agent is not an acrylic sticky agent, the polymer component other than the acrylic polymer may be a component whose side chain is energy-ray polymerizable.

The thermosetting resin used as the resin layer 3 is not particularly limited. Specific examples of the thermosetting resin include an epoxy resin, phenol resin, melamine resin, urea resin, polyester resin, urethane resin, acrylic resin, benzoxazine resin, phenoxy resin, amine compound and acid anhydride compound. One of the thermosetting resins may be used alone, or two or more thereof may be used in combination. Among the above examples, in terms of suitability for curing with an imidazole curing catalyst, it is preferable to use an epoxy resin, phenol resin, melamine resin, urea resin, amine compound and acid anhydride compound. Particularly, in terms of exhibiting an excellent curability, it is preferable to use a mixture of an epoxy resin, phenol resin, a mixture thereof, or a mixture of an epoxy resin and at least one selected from the group consisting of a phenol resin, melamine resin, urea resin, amine compound and acid anhydride compound.

A moisture-curable resin used as the resin layer 3 is not particularly limited. Examples of the moisture-curable resin include a urethane resin from which an isocyanate group is generated by moisture, and a modified silicone resin.

When the energy-ray-curable resin or the thermosetting resin is used, a photopolymerization initiator, thermal polymerization initiator, or the like is preferably used. A cross-linking structure is formed by using the photopolymerization initiator, thermal polymerization initiator, or the like, making it possible to more firmly protect the pseudo sheet structure 2.

Examples of the photopolymerization initiator include benzophenone, acetophenone, benzoin, benzoinmethylether, benzoinethylether, benzoinisopropylether, benzoinisobutylether, benzoin benzoic acid, benzoin methyl benzoate, benzoin dimethylketal, 2,4-diethyl thioxanthene, 1-hydroxy cyclohexylphenylketone, benzyl diphenyl sulfide, tetramethylthiuram monosulfide, azobisisobutyronitrile, 2-chloroanthraquinone, diphenyl(2,4,6-trimethylbenzoyl)phosphine oxide, and bis(2,4,6-trimethylbenzoyl)-phenyl-phosphine oxide.

Examples of the thermal polymerization initiator include hydrogen peroxide, peroxydisulfuric acid salts (e.g., ammonium peroxodisulfate, sodium peroxodisulfate, and potassium peroxodisulfate), azo compounds (e.g., 2,2'-azobis(2-amidinopropane)dihydrochloride, 4,4'-azobis(4-cyanovaleric acid), 2,2'-azobisiosbutyronitrile, and 2,2'-azobis(4-methoxy-2,4-dimethylvaleronitrile)), and organic peroxides (e.g., benzoyl peroxide, lauroyl peroxide, peracetic add, persuccinic add, di-t-butyl peroxide, t-butyl hydroperoxide, and cumene hydroperoxide).

One of the polymerization initiators may be used alone, or two or more thereof may be used in combination.

When the polymerization initiator is used for forming a cross-linking structure, the content of the polymerization initiator is preferably in a range from 0.1 parts by mass to 100 parts by mass, more preferably in a range from 1 parts by mass to 100 parts by mass, particularly preferably in a range from 1 parts by mass to 10 parts by mass, with respect to 100 parts by mass of the energy-ray-curable resin or the thermosetting resin.

The resin layer 3 may not be curable, and may be, for instance, a layer formed from a thermoplastic resin composition. A thermoplastic resin layer can be softened by containing a solvent in the thermoplastic resin composition. With this configuration, when forming the pseudo sheet structure 2 on the resin layer 3, attachment of the conductive linear bodies 21 to the resin layer 3 is facilitated. The thermoplastic resin layer can be dried to be solidified by volatilizing the solvent in the thermoplastic resin composition.

Examples of the thermoplastic resin include polyethylene, polypropylene, polyvinyl chloride, polystyrene, polyvinyl acetate, polyurethane, polyether, polyethersulfone, polyimide and acrylic resin.

Examples of the solvent include an alcohol solvent, ketone solvent, ester solvent, ether solvent, hydrocarbon solvent, alkyl halide solvent, and water.

The resin layer 3 may contain an inorganic filler. The resin layer 3 containing the inorganic filler can have further improved hardness when cured. In addition, the resin layer 3 containing the inorganic filler has improved heat conductivity.

Examples of the inorganic filler include inorganic powder (e.g., powders of silica, alumina, talc, calcium carbonate, titanium white, colcothar, silicon carbide, and boron nitride), beads of spheroidized inorganic powder, single crystal fiber, and glass fiber. Among the above, a silica filler and an alumina filler are preferable as the inorganic filler. One of the inorganic fillers may be used alone, or two or more thereof may be used in combination.

The resin layer 3 may contain other components. Examples of other components include known additives such as an organic solvent, a flame retardant, a tackifier, an ultraviolet absorber, an antioxidant, a preservative, an antifungal agent, a plasticizer, a defoamer, and a wettability modifier.

A thickness of the resin layer 3 is determined as needed depending on an intended use of the wiring sheet 100. For instance, in view of adhesiveness, the thickness of the resin layer 3 is preferably in a range from 3 μm to 150 μm, more preferably in a range from 5 μm to 100 μm.

Electrodes

The electrodes 4 are used for supplying electric current to the conductive linear bodies 21. The electrodes 4 are formable using a known electrode material. Examples of the electrode material include a conductive paste (e.g. silver paste), metallic foil (e.g. copper foil), and metal wire. The electrodes 4 are disposed in electrical connection on both ends of each of the conductive linear bodies 21. When the electrode material is a metal wire, the metal wire may be a single wire, but is preferably provided by two or more wires.

Examples of metal of the metallic foil or metal wire include metals such as copper, aluminum, tungsten, iron, molybdenum, nickel, titanium, silver, and gold and alloys containing two or more metals (e.g., steels such as stainless steel and carbon steel, brass, phosphor bronze, zirconium copper alloy, beryllium copper, iron nickel, nichrome, nickel titanium, kanthal, hastelloy, and rhenium tungsten). The metallic foil or metal wire may be plated with tin, zinc, silver, nickel, chromium, nickel-chromium alloy, solder, or the like. Especially, plating containing at least one metal selected from copper, silver, and an alloy containing copper and/or silver is preferable in view of metal having a low-volume-resistivity.

In a plan view of the pseudo sheet structure 2, the width of the electrodes 4 is preferably 100 mm or less, more preferably 10 mm or less, and further preferably 100 μm or less. The temperature variation is more likely to occur as the width of the electrodes 4 degreases. However, the wiring sheet 100 according to the exemplary embodiment can restrain the temperature variation even when the width of the electrodes 4 is small. When the electrodes 4 are made from a metal wire, the width of the electrodes 4 means the diameter of the metal wire.

A ratio of resistance values between the electrodes 4 and the pseudo sheet structure 2 (i.e. the resistance value of the electrodes 4/the resistance value of the pseudo sheet structure 2) is preferably in a range from 0.0001 to 0.3, and more preferably in a range from 0.0005 to 0.1. The ratio of the resistance values between the electrodes and the pseudo sheet structure 2 can be calculated from "the resistance value of the electrodes 4/the resistance value of the pseudo sheet structure 2." At the ratio of the resistance values falling within this range, when the wiring sheet 100 is used as a heat-generating body, abnormal heat generation at the electrodes are restrained. When the pseudo sheet structure 2 is used as a sheet-shaped heater, heat is generated only in the pseudo sheet structure 2, thereby providing a sheet-shaped heater with excellent heat generation efficiency.

The resistance values of the electrodes 4 and the pseudo sheet structure 2 can be measured using a tester. First, the resistance value of the electrodes 4 is measured and the resistance value of the pseudo sheet structure 2 attached with the electrodes 4 is measured. Subsequently, the respective resistance values of the electrodes 4 and the pseudo sheet structure 2 are calculated by subtracting the measurement value of the electrodes 4 from the resistance value of the pseudo sheet structure 2 attached with the electrodes.

Power Feeder

The first and second power feeders 51 and 52 are configured to apply voltage to the wiring sheet 100. When the electrodes 4 are exposed to be electrically connectable, any part of the electrodes 4 may function as the first power feeder 51 or the second power feeder 52.

Alternatively, for the convenience of connection between a power source (not shown) to the electrodes 4, the first and second power feeders 51 and 52 may be separately provided. In this case, the material for the first and second power feeders 51 and 52 may be the same as the material for the electrodes 4. Further, when the electrodes 4 are covered with an insulation material for preventing short circuit and the like, the first and second power feeders 51 and 52 may be provided by removing a part of the insulation material.

Method for Manufacturing Wiring Sheet

The method for manufacturing the wiring sheet 100 according to the exemplary embodiment is not specifically limited. The wiring sheet 100 can be manufactured, for instance, by a process described below.

First, the base material 1 is coated with a composition for forming the resin layer 3 to form a coating film. Subsequently, the coating film is dried to form the resin layer 3, Then, the conductive linear bodies 21 are arrayed on the resin layer 3 to form the pseudo sheet structure 2. For instance, a drum member is rotated while the resin layer 3 attached with the base material 1 is disposed on an outer circumferential surface of the drum member, and the conductive linear bodies 21 are spirally wound on the resin layer 3 during the rotation of the drum member. After that, a bundle of the conductive linear bodies 21 spirally wound is cut along an axial direction of the drum member, resulting in the conductive linear bodies 21 arranged on the resin layer 3. The resin layer 3 attached with the base material 1, on which the quasi-sheet structure 2 is formed, is taken off the drum member, thereby obtaining a sheet-shaped conductive member. According to this method, the interval L between adjacent ones of the conductive linear bodies 21 of the quasi-sheet structure 2 is easily adjusted by, for instance, moving a feeder of the conductive linear bodies 21 along a direction parallel with an axis of the drum member while turning the drum member.

Next, the electrodes 4 are attached to respective ends of the conductive linear bodies 21 of the pseudo sheet structure 2 of the sheet-shaped conductive member. Then, the first and second power feeders 51 and 52 are provided to produce the wiring sheet 100.

Advantages of First Exemplary Embodiment

The following advantages can be achieved by the exemplary embodiment.

(1) According to the exemplary embodiment, when the conditions represented by the numerical formulae (F2) and (F3) are satisfied, the resistance value of the conductive linear bodies 21 is lower with increased distance from the first and second powerfeeders 51 and 52. This can inhibit the temperature variation in the wiring sheet 100.

(2) In the exemplary embodiment, the length of the conductive linear bodies 21 is shorter with increased distance from the first and second power feeders 51 and 52. Thus, the resistance value of the conductive linear bodies 21 can be lower with increased distance from the first and second power feeders 51 and 52.

(3) The wiring sheet 100 according to the exemplary embodiment, which can restrain the temperature variation, is suitably usable as a sheet-shaped heater.

Second Exemplary Embodiment

Next, a second exemplary embodiment of the invention will be described below with reference to attached drawings.

Figure 3:
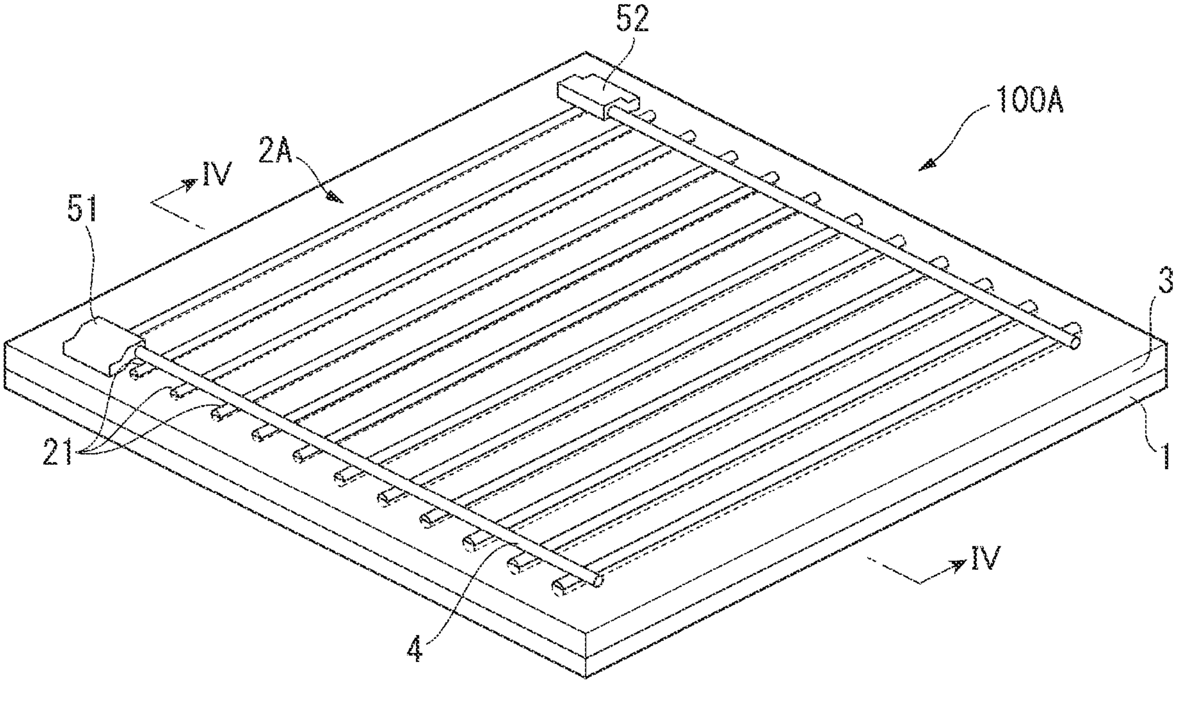
FIG. 3 schematically shows a wiring sheet according to a second exemplary embodiment of the invention.
Figure 4:
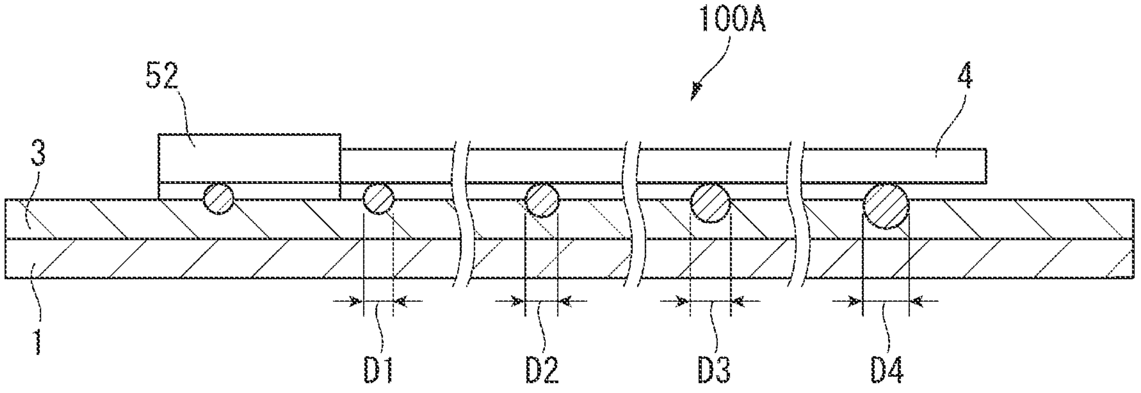
FIG. 4 is a cross sectional view taken along a IV-IV in FIG. 1.

As shown in FIGS. 3 and 4, a wiring sheet 100A according to the exemplary embodiment includes the base material 1, a pseudo sheet structure 2A, the resin layer 3, and the pair of electrodes 4. The pseudo sheet structure 2A is configured by the plurality of conductive linear bodies 21 arranged at intervals. The first power feeder 51 is provided on one of the electrodes 4, and the second power feeder 52 is provided on the other of the electrodes 4.

It should be noted that the second exemplary embodiment is similar to the first exemplary embodiment except for a method for adjusting the resistance value of the conductive linear bodies 21. Thus, description will be focused on the method for adjusting the resistance value of the conductive linear bodies 21, and the description common to the first exemplary embodiment will be omitted.

In the exemplary embodiment, the diameter of the conductive linear bodies 21 is larger in an order of D1, D2, D3, and D4 as shown in FIG. 4. In other words, the diameter of the conductive linear bodies 21 is larger with increased distance from the first and second power feeders 51 and 52. The cross-sectional area of the conductive linear bodies 21 is also larger with increased distance from the first and second power feeders 51 and 52. In such an arrangement, the resistance value of the conductive linear bodies 21 can be lower with increased distance from the first and second power feeders 51 and 52.

Advantages of Second Exemplary Embodiment

According to the exemplary embodiment, the following advantage (4) can be achieved in addition to the advantages (1) and (3) in the first exemplary embodiment.

(4) In the exemplary embodiment, the diameter of the conductive linear bodies 21 is larger with increased distance from the first and second power feeders 51 and 52. Thus, the resistance value of the conductive linear bodies 21 can be lower with increased distance from the first and second power feeders 51 and 52. Unlike the first exemplary embodiment, it is not necessary to change the length of the conductive linear bodies 21. This makes it possible to make the planar shape of the wiring sheet 100A a rectangle, square, or the like.

Third Exemplary Embodiment

A third exemplary embodiment of the invention will be described below reference to the attached drawings.

Figure 5:
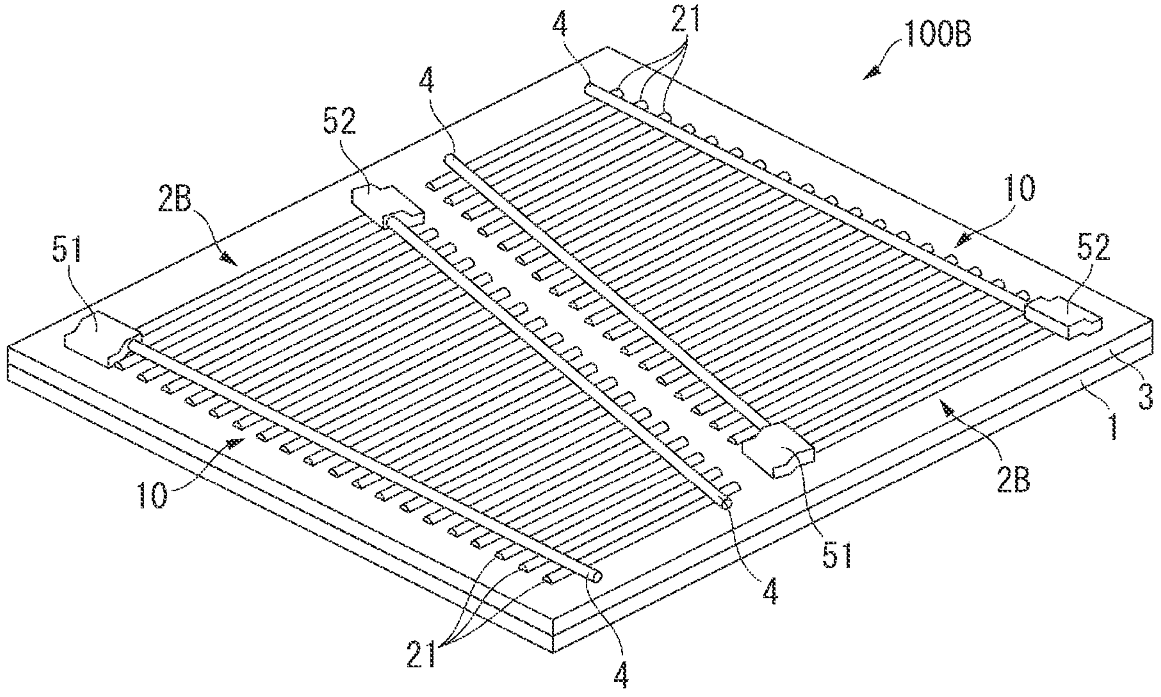
FIG. 5 schematically shows a wiring sheet according to a third exemplary embodiment of the invention.

As shown in FIG. 5, a wiring sheet 100B according to the exemplary embodiment includes the base material 1, two pseudo sheet structures 2B, the resin layer 3, and the pair of electrodes 4. The pseudo sheet structures 2B are each configured by the plurality of conductive linear bodies 21 arranged at intervals. The first power feeder 51 is provided on one of the electrodes 4, and the second power feeder 52 is provided on the other of the electrodes 4.

The wiring sheet 100B according to the exemplary embodiment is configured such that two wiring sheets 100 according to the first exemplary embodiment are arranged side by side in a plan view of the wiring sheet 100. The base material 1 the pseudo sheet structure 2B, the resin layer 3, and the electrodes 4 are the same as those in the first exemplary embodiment. Thus, description will be focused on the arrangement of the two pseudo sheet structures 2B and the like, and the description common to what has been described above will be omitted.

In the exemplary embodiment, two wiring structures 10 each including the pseudo sheet structure 2B, the pair of electrodes 4, the first power feeder 51, and the second power feeder 52 are provided, as shown in FIG. 5. The length of the conductive linear bodies 21 is shorter with increased distance from the first and second power feeders 51 and 52. Thus, the planar shape of each wiring structure 10 is a trapezoid, and the side at which the first and second power feeders 51, 52 are provided is longer. In a plan view of the wiring sheet 100B, the two wiring structures 10 are arranged so that the first and second power feeders 51 and 52 in the respective wiring structures 10 are provided on the opposite sides.

Advantages of Third Exemplary Embodiment

According to the exemplary embodiment, the following advantage (5) can be achieved in addition to the advantages (1) to (3) in the first exemplary embodiment.

(5) In the exemplary embodiment, the two wiring structures 10 each having a trapezoidal shape in a plan view are arranged so that lower bases of the respective trapezoid are positioned at the opposite sides in a plan view of the wiring sheet 100B. In such an arrangement, the lower base of one of the trapezoids and the upper base of the other of the trapezoids are present at both ends of the wiring sheet 100B. This makes it possible to substantially equalizes the length of the wiring at both ends of the wiring sheet 100B, so that the planar shape of the wiring sheet 100B can be formed into, for instance, a rectangle or square, Modifications of Exemplary Embodiment(s)

The scope of the invention is not limited to the above exemplary embodiments, and modifications, improvements, etc. are included within the scope of the invention as long as they are compatible with an object of the invention, For instance, the wiring sheet 100 includes the base material 1 in the above exemplary embodiment. The invention, however, is not limited thereto. As an example, the wiring sheet 100 may not include the base material 1. In such a case, the wiring sheet 100 is usable by being attached to an adherend through the resin layer 3.

The wiring sheet 100 includes the resin layer 3 in the above exemplary embodiment. The invention, however, is not limited thereto. As an example, the wiring sheet 100 may not include the resin layer 3. In such a case, a fabric or knitting may be used as the base material 1 and the pseudo sheet structure 2 may be formed by weaving the conductive linear bodies 21 into the base material 1.

EXAMPLES

The invention will be described in further detail with reference to Examples. It should be noted that the scope of the invention is not limited to Examples.

Example 1

An acrylic sticky agent was applied at a thickness of 20 μm on a base material in a form of a 100-μm thick polyurethane film to provide a resin layer, thereby preparing a sticky sheet.

A Wire injector (manufactured by LINTEC Corporation) was used to inject metal wires (material: tungsten, diameter: 80 μm) having a circular cross section on the sticky sheet while moving a nozzle to array the metal wires as the conductive linear bodies. Subsequently, electrodes (width: 80 μm, material: copper) were provided on respective ends of the metal wires, and then each of the first and second power feeders (material of both feeders: copper) was provided on an end of one of the electrodes to produce a wiring sheet shown in FIG. 1. The first metal wire counted from the side at which the first and second power feeders are provided has a length of 200 mm, and the last metal wire counted from the side at which the first and second power feeders are provided has a length of 120 mm. The length of the metal wires is shorter with increased distance from the side at which the first and second power feeders are provided.

In the obtained wiring sheet, the number N of the metal wires was 30, the resistance value R of the electrodes was 306 mΩ, the resistance value $r_1$ of the metal wires was 25,070 mΩ, $r_2$ to $r_{29}$ were values sequentially decremented approximately by 306 mΩ, and $r_{30}$ was 16,196 mΩ. Further, the interval between the metal wires was 10 mm.

Comparative 1:

A wiring sheet was produced in the same manner as in Example 1 except that the metal wires had the same length (all of the metal wires had a length of 200 mm).

In the obtained wiring sheet, the number N of the metal wires was 30, the resistance value R of the electrodes was 306 mΩ, and the resistance values $r_1$ to $r_{30}$ of all of the metal wires were 25,070 mΩ. Further, the interval between the metal wires was 10 mm.

Evaluation on Temperature Difference of Sheet-Shaped Heater

Figure 6:
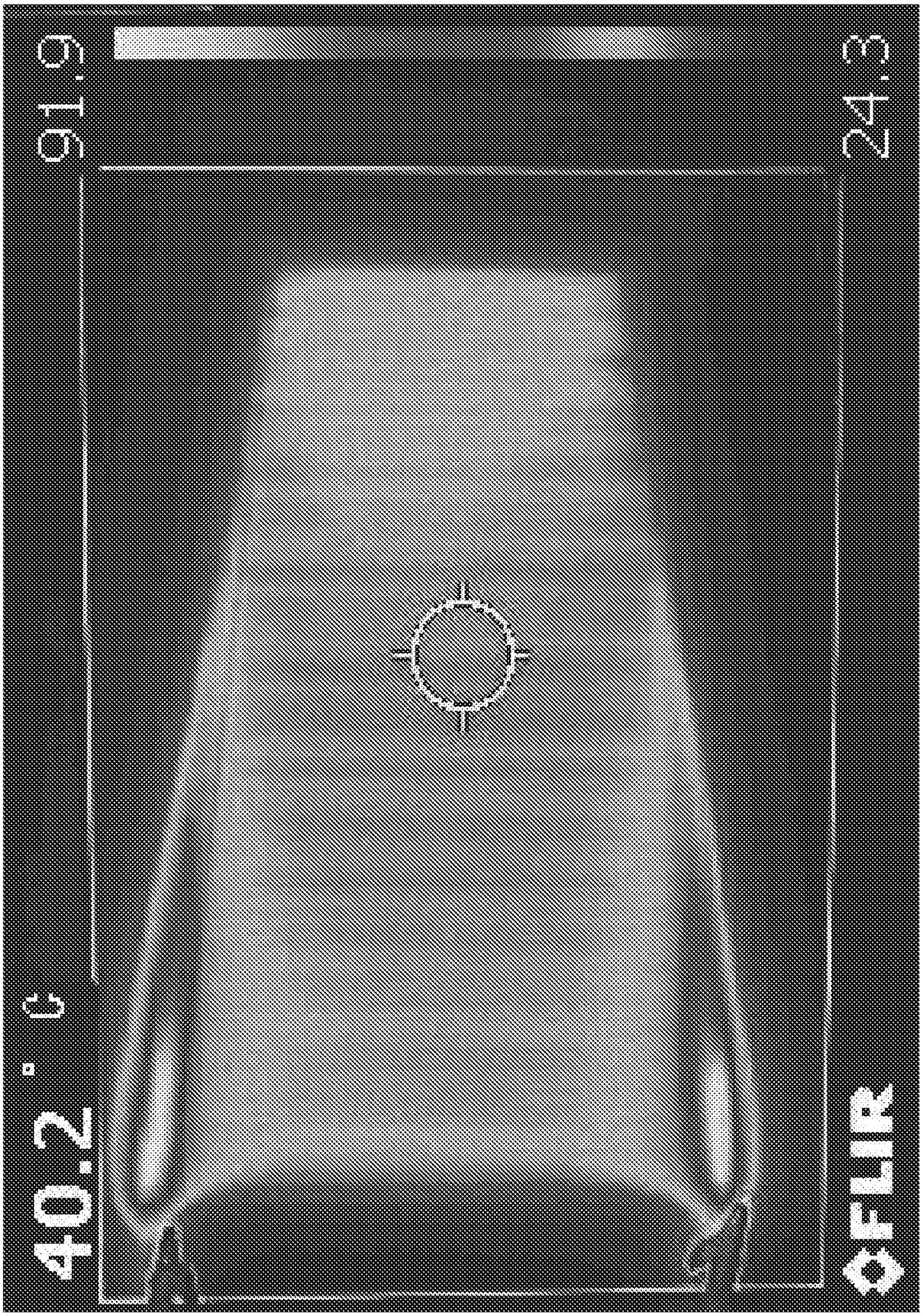
FIG. 6 is a photograph showing measurement result of temperature distribution in a wiring sheet produced in Example 1.
Figure 7:
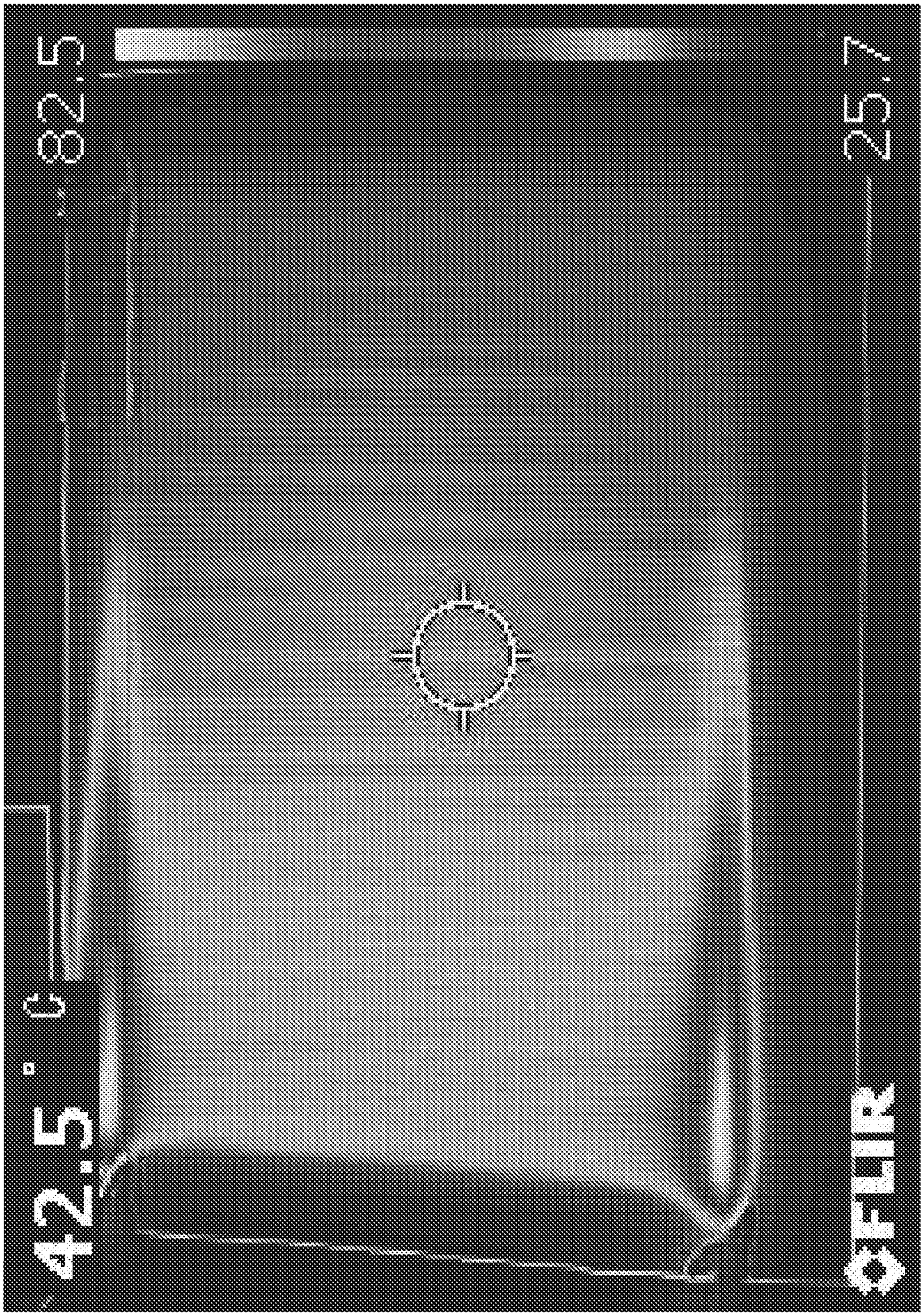
FIG. 7 is a photograph showing measurement result of temperature distribution in a wiring sheet produced in Comparative 1.

After 5.0 V voltage was applied to a sheet-shaped heater for heat generation, temperature distribution of the sheet-shaped heater was measured from a point located 150 mm away from a surface of the sheet-shaped heater using a thermography camera ("FLIR C2" manufactured by Teledyne FLIR LLC). Emissivity during the measurement was set to 0.95. The measurement result of the temperature distribution of the sheet-shaped heater produced in Example 1 is shown in FIG. 6. The measurement result of the temperature distribution of the sheet-shaped heater produced in Comparative 1 is shown in FIG. 7.

Figure 8:
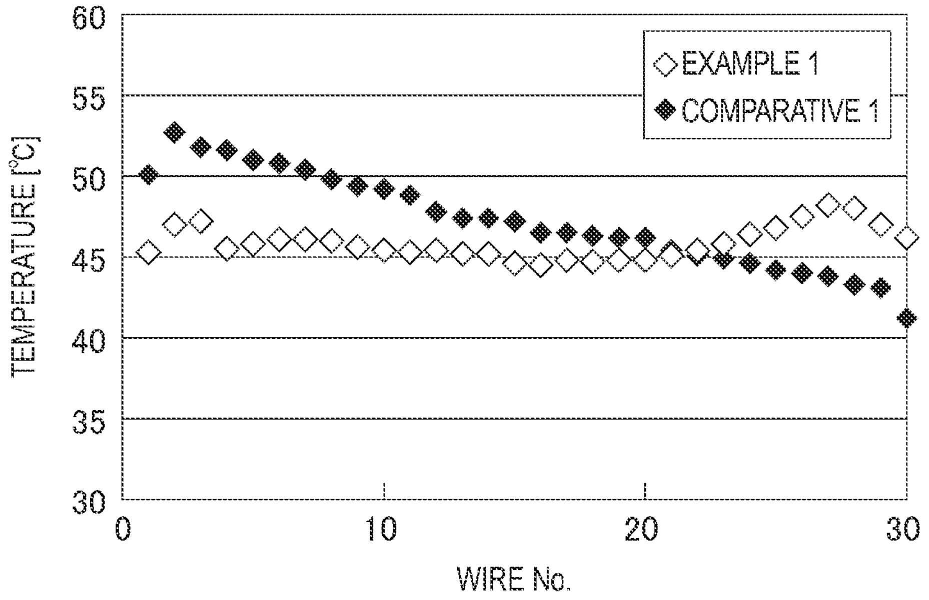
FIG. 8 is a graph showing a relationship between wire temperatures and numbered wires in the measurement of the temperature distribution of the wiring sheets in Example 1 and Comparative 1.

Then, the temperatures of the 30 wires were read from the obtained temperature distribution. The results are shown in FIG. 8. Further, a difference between a maximum temperature and a minimum temperature in 28 wires (i.e. wires other than the wires at both ends among the 30 wires) was determined as a temperature difference (unit: degrees C.). It means that the smaller the temperature difference is, the more the temperature variation is restrained.

The temperature difference in Example 1 was 3.7 degrees C., whereas the temperature difference in Comparative 1 was 11.5 degrees C. The results show that the sheet-shaped heater in Example 1 is smaller in temperature difference than the sheet-shaped heater in Comparative 1, and the sheet-shaped heater in Example 1 can inhibit the temperature variation.

Confirmation of Advantages

Power consumption distribution was analyzed as described below in order to confirm that the exemplary embodiment was able to provide a wiring sheet capable of restraining the temperature variation.

In analyzing the power consumption distribution, the wiring sheet according to the exemplary embodiment was applied to a ladder-shaped circuit diagram for analysis of the power consumption distribution in the circuit.

The number N of the conductive linear bodies 21, the resistance value $r_1$ [mΩ] of the first conductive linear body 21 counted from the side at which the first and second power feeders 51 and 52 are provided, the resistance value $r_N$ [mΩ] of the N-th conductive linear body 21 counted from the side at which the first and second power feeders 51 and 52 are provided, and the resistance value R [mΩ] of the electrodes 4 were as shown in Tables 1 and 2. It should be noted that the values $r_2$ to $r_{N-1}$ [mΩ] were gradually decreased from the value $r_1$ to the value $r_N$ at the same change rate.

Further, the value $r_1$-$r_N$ [mΩ] and the value NR [mΩ] were as shown in Tables 1 and 2.

Power consumption of each of the conductive linear bodies (i.e. from the first conductive linear body 21 to the N-th conductive linear body 21) when electric current was applied to the above circuit was calculated to analyze the power consumption distribution. Maximum power consumption, minimum power consumption, and average power consumption were calculated from the obtained power consumption distribution to calculate an electric power variation (unit: ±%) based on a formula below. The results of Examples 1 to 19 are shown in Table 1. The results of Examples 20 to 37 are shown in Table 2.

$$(\text{electric power variation})=[\{(\text{maximum power consumption})-(\text{minimum power consumption})\}/(\text{average power consumption})/2]\times 100$$

Presumably, the smaller the electric power variation is, the more temperature variation is restrained. The electric power variation was evaluated according to criteria below. The results of Examples 1 to 19 are shown in Table 1. The results of Examples 20 to 37 are shown in Table 2.

A: the numerical value of the electric power variation is 20 [±%] or less,

B: the numerical value of the electric power variation exceeds 20 [±%] and 30 [±%] or less.

C: the numerical value of the electric power variation exceeds 30 [±%] and 100 [±%] or less.

TABLE 1

| | Conductive linear body | | | Electrode | r1 − rN | N*R | Electric power variation | Evaluation on Electric power |
|---|---|---|---|---|---|---|---|---|
| | Number N | r1 [mΩ] | rN [mΩ] | R [mΩ] | [mΩ] | [mΩ] | [±%] | variation |
| Ex. 1 | 20 | 12535 | 12535 | 204 | 0 | 4084 | 41.0 | C |
| Ex. 2 | 20 | 12535 | 10000 | 204 | 2535 | 4084 | 20.5 | B |
| Ex. 3 | 20 | 12535 | 8000 | 204 | 4535 | 4084 | 22.1 | B |
| Ex. 4 | 20 | 25070 | 25070 | 204 | 0 | 4084 | 20.4 | B |
| Ex. 5 | 20 | 25070 | 22500 | 204 | 2570 | 4084 | 10.0 | A |
| Ex. 6 | 20 | 25070 | 21000 | 204 | 4070 | 4084 | 6.4 | A |
| Ex. 7 | 20 | 25070 | 20000 | 204 | 5070 | 4084 | 11.6 | A |
| Ex. 8 | 30 | 12535 | 12535 | 306 | 0 | 9189 | 95.2 | C |
| Ex. 9 | 30 | 12535 | 8000 | 306 | 4535 | 9189 | 59.3 | C |
| Ex. 10 | 30 | 12535 | 4000 | 306 | 8535 | 9189 | 61.0 | C |
| Ex. 11 | 30 | 12535 | 3500 | 306 | 9035 | 9189 | 80.9 | C |
| Ex. 12 | 30 | 25070 | 25070 | 306 | 0 | 9189 | 47.6 | C |
| Ex. 13 | 30 | 25070 | 23000 | 306 | 2070 | 9189 | 39.2 | C |
| Ex. 14 | 30 | 25070 | 22000 | 306 | 3070 | 9189 | 35.2 | C |
| Ex. 15 | 30 | 25070 | 21000 | 306 | 4070 | 9189 | 31.1 | C |
| Ex. 16 | 30 | 25070 | 20000 | 306 | 5070 | 9189 | 27.0 | B |
| Ex. 17 | 30 | 25070 | 18000 | 306 | 7070 | 9189 | 18.7 | A |
| Ex. 18 | 30 | 25070 | 16000 | 306 | 9070 | 9189 | 18.4 | A |
| Ex. 19 | 30 | 25070 | 14000 | 306 | 11070 | 9189 | 34.0 | C |

TABLE 2

| | Conductive linear body | | | Electrode | r1 − rN | N*R | Electric power variation | Evaluation on Electric power |
|---|---|---|---|---|---|---|---|---|
| | Number N | r1 [mΩ] | rN [mΩ] | R [mΩ] | [mΩ] | [mΩ] | [±%] | variation |
| Ex. 20 | 30 | 50140 | 50140 | 306 | 0 | 9189 | 23.6 | B |
| Ex. 21 | 30 | 50140 | 48000 | 306 | 2140 | 9189 | 19.3 | A |
| Ex. 22 | 30 | 50140 | 46000 | 306 | 4140 | 9189 | 15.2 | A |
| Ex. 23 | 30 | 50140 | 44000 | 306 | 6140 | 9189 | 11.1 | A |
| Ex. 24 | 30 | 50140 | 42000 | 306 | 8140 | 9189 | 7.0 | A |
| Ex. 25 | 30 | 50140 | 41000 | 306 | 9140 | 9189 | 7.4 | A |
| Ex. 26 | 30 | 50140 | 40000 | 306 | 10140 | 9189 | 9.9 | A |
| Ex. 27 | 30 | 50140 | 38000 | 306 | 12140 | 9189 | 15.5 | B |
| Ex. 28 | 50 | 50140 | 50140 | 511 | 0 | 25525 | 67.9 | C |
| Ex. 29 | 50 | 50140 | 40000 | 511 | 10140 | 25525 | 47.4 | C |
| Ex. 30 | 50 | 50140 | 30000 | 511 | 20140 | 25525 | 26.5 | B |
| Ex. 31 | 50 | 50140 | 28000 | 511 | 22140 | 25525 | 22.2 | B |
| Ex. 32 | 50 | 50140 | 25000 | 511 | 25140 | 25525 | 32.6 | C |
| Ex. 33 | 50 | 50140 | 20000 | 511 | 30140 | 25525 | 62.7 | C |
| Ex. 34 | 50 | 100280 | 100280 | 511 | 0 | 25525 | 33.7 | C |
| Ex. 35 | 50 | 100280 | 80000 | 511 | 20280 | 25525 | 12.9 | A |
| Ex. 36 | 50 | 100280 | 75000 | 511 | 25280 | 25525 | 11.1 | A |
| Ex. 37 | 50 | 100280 | 70000 | 511 | 30280 | 25525 | 18.6 | A |

The invention claimed is:

1. A wiring sheet comprising:

a pseudo sheet structure comprising a plurality of conductive linear bodies arranged at intervals;

a first electrode;

a second electrode;

and a first power feeder provided for the first electrode and a second power feeder provided for the second electrode, wherein the first power feeder is connected to the first electrode and the second power feeder is connected to the second electrode, the first power feeder and the second power feeder are configured to apply a voltage to the pseudo sheet structure, assuming that a number of the conductive linear bodies is N, a resistance value of a n-th conductive linear body counted from a side at which the first power feeder and the second power feeder are provided is $r_n$, and a resistance value of the electrodes is R, all of conditions represented by numerical formulae (F1), (F2), and (F3) below are satisfied, $$r_1/R \leq 300 \quad \text{(F1)}$$

$$r_{n+1} \leq r_n \quad \text{(F2)}$$

where n is an integer of 1 or more in the formula (F2), and $$0 < r_1 - r_N \leq NR \quad \text{(F3).}$$

2. The wiring sheet according to claim 1, wherein an interval between the conductive linear bodies is 20 mm or less.

3. The wiring sheet according to claim 1, wherein a width of each of the electrodes is 100 mm or less in a plan view of the pseudo sheet structure.

4. The wiring sheet according to claim 1, further comprising a base material supporting the pseudo sheet structure.

5. A sheet-shaped heater comprising the wiring sheet according to claim 1.

* * * * *